(12) United States Patent
Sung et al.

(10) Patent No.: US 8,731,891 B2
(45) Date of Patent: May 20, 2014

(54) CLUSTER 3D PETROPHYSICAL UNCERTAINTY MODELING

(75) Inventors: Roger R. Sung, Dhahran (SA); Khalid S. Al-Wahabi, Dammam-Al-Nada (SA)

(73) Assignee: Saudi Arabian Oil Company, Dhahran (SA)

( * ) Notice: Subject to any disclaimer, the term of this patent is extended or adjusted under 35 U.S.C. 154(b) by 383 days.

(21) Appl. No.: 13/193,086

(22) Filed: Jul. 28, 2011

(65) Prior Publication Data

US 2013/0030777 A1    Jan. 31, 2013

(51) Int. Cl.
  *G06F 7/60* (2006.01)
  *G06G 7/48* (2006.01)

(52) U.S. Cl.
  USPC ................................. 703/10; 703/2; 703/6

(58) Field of Classification Search
  None
  See application file for complete search history.

(56) References Cited

U.S. PATENT DOCUMENTS

| | | | | |
|---|---|---|---|---|
| 5,838,634 | A * | 11/1998 | Jones et al. | 367/73 |
| 6,549,879 | B1 * | 4/2003 | Cullick et al. | 703/10 |
| 6,885,941 | B2 * | 4/2005 | Deffenbaugh et al. | 702/2 |
| 7,433,784 | B2 * | 10/2008 | Deffenbaugh et al. | 702/2 |
| 7,526,418 | B2 | 4/2009 | Pita et al. | |
| 2004/0220789 | A1 * | 11/2004 | Thore et al. | 703/10 |
| 2005/0049802 | A1 * | 3/2005 | Minton, Jr. | 702/45 |
| 2006/0036418 | A1 | 2/2006 | Pita et al. | |
| 2007/0219724 | A1 * | 9/2007 | Li et al. | 702/12 |

FOREIGN PATENT DOCUMENTS

| | | |
|---|---|---|
| WO | 01/40937 A1 | 6/2001 |
| WO | 2010/101593 A1 | 9/2010 |
| WO | 2010/123596 A1 | 10/2010 |

OTHER PUBLICATIONS

PCT Int'l Search Report and the Written Opinion dated Jun. 7, 2013; Int'l Application No. PCT/US2012/046841; Int'l Filing Date: Jul. 16, 2012.
Wheeler, M. F., et al., A Parallel Multiblock/Multidomain Approach for Reservoir Simulation, SPE 51884,1999 SPE Reservoir Simulation Symposium held in Houston, Texas, Feb. 14-17, 1999, Society of Petroleum Engineers.

* cited by examiner

*Primary Examiner* — Omar Fernandez Rivas
*Assistant Examiner* — Nithya J Moll
(74) *Attorney, Agent, or Firm* — Bracewell & Giuliani LLP; Constance Gall Rhebergen; Albert B. Kimball, Jr.

(57) ABSTRACT

Reservoir properties or attributes such as water saturation, porosity and permeability are determined directly at each cell of a three dimensional grid of a subsurface hydrocarbon reservoir. Input parameters based on original data from petrophysical measurements and other attributes of the reservoir and its subsurface features are generated over a range of uncertainties for the individual cells. The predicted input parameters for the individual cells are provided as processing inputs for petrophysical algorithms. The input parameters at different measures of possible uncertainties for the cells of the reservoir are processed using cluster computers to determine on a cell-by-cell basis a number of possible scenarios or results for the reservoir attributes of interest. The determinations made for the different scenarios can then be assembled as postulated models for sections of interest of the reservoir grid, and the postulated models evaluated to more accurately obtain reservoir attributes over the reservoir, even for areas where no well intersects the reservoir.

30 Claims, 6 Drawing Sheets
(3 of 6 Drawing Sheet(s) Filed in Color)

CLUSTER 3D PETROPHYSICAL UNCERTAINTY MODELING

BACKGROUND OF THE INVENTION

1. Field of the Invention

The present invention relates to computerized simulation of hydrocarbon reservoirs in the earth which have been modeled as a three-dimensional grid of cells, and in particular to determination of reservoir attributes or properties on a cell-by-cell basis for the individual cells in the reservoir model.

2. Description of the Related Art

In the oil and gas industries, the development of underground hydrocarbon reservoirs typically includes development and analysis of computer simulation models. These underground hydrocarbon reservoirs are typically complex rock formations which contain both a petroleum fluid mixture and water. The reservoir fluid content usually exists in two or more fluid phases. The petroleum mixture in reservoir fluids is produced by wells drilled into and completed in these rock formations. Simulations of the nature and extent of the reservoir fluids is performed by what is known as reservoir simulation modeling. U.S. Pat. No. 7,526,418, which is owned by the assignee of the present application, is an example of reservoir simulation modeling.

The nature and extent of the rock formations in the reservoir also vary over the reservoir, and certain characteristics, known as properties or attributes, of the rock in the formations also vary. The attributes, and the nature and extent of the rock formations, are analyzed by what is known as geological modeling. Attributes such as water or oil saturation, porosity and permeability provided from the geological model are valuable in the planning and development of a reservoir.

Oil and gas companies have come to depend on geological models as an important tool to enhance the ability to exploit a petroleum reserve. Geological models of reservoirs and oil/gas fields have become increasingly large and complex.

The early development of compositional reservoir simulators in the industry was, so far as is known, restricted to reservoir models small enough to be characterized by a relatively small number of cells (of the order of 100,000) into which the reservoir of interest was organized.

The early models became too coarse in data content and accuracy for what have become known as giant oil and gas fields. Giant reservoirs are those mammoth subsurface reservoirs at various locations on the earth containing hydrocarbons and other fluids. Due to the reservoir size, the number of cells could be from one to several millions.

In addition, the increased accuracy of detailed seismic-data which samples the reservoir at 25-meter areal (x and y) intervals, has begun to demand models of hundreds of millions to billions of cells to assimilate all the available detail, which in turn has been intended to result in more accurate models of the reservoir and has lead to more effective and efficient reservoir performance.

There are a number of available computer implemented petrophysical modeling processes, also known in the art as petrophysical algorithms, which can be used to obtain measures of reservoir attributes based on data from formation core samples obtained from existing wells in the reservoir. Traditionally, such petrophysical algorithms were applied at the individual well location based on data obtained, from the well from the core samples. However, when characterizing and developing a reservoir field, a 3D geological model of the reservoir covering the entire 3D reservoir needs to be built to give accurate model for reservoir planning. The vast majority of model cells which do not lie at well locations have required some sort of interpolation technique to provide values of reservoir attributes for that vast majority of cells. The interpolation was applied between attribute values obtained from cell information at the locations of existing wells which had been calculated using conventional petrophysical algorithms. However, attributes of subsurface formation layers vary over the extent of the formation in the reservoir.

In the past when attempting to derive model attributes in the vast spaces over the reservoir where no well intersects, averaging methods from the few available data points have been applied. The interpolation or averaging method generally did not yield the accuracy as calculated from petrophysical algorithms. This technique thus suffered a lack of accuracy in attribute values when representing the usually complex structural nature of a reservoir. This is particularly the case where a giant reservoir is involved.

Essential reservoir properties like permeability are thus, so far as is known, currently calculated when building a geological model by using a few empirical functions or interpolated from those available locations, usually few, with actual well information. The geological model size usually ranges from tens of thousands for small reservoirs to hundreds of millions of cells for giant reservoirs. So far as is known, the current averaging or interpolation methods do not provide sufficient detail or accuracy in complex reservoirs.

SUMMARY OF THE INVENTION

Briefly, the present invention provides a new and improved computer implemented method of computerized simulation, in a computer system including at least one master node and a plurality of processor nodes. The reservoir model formed is of a property of the subsurface reservoir structure. The reservoir model being simulated is partitioned into a number of cells arranged in an organized system of cells, and the simulation is further is based on projected values of input parameters for the cells of the reservoir. The projected value of the input parameter is generated on a random basis and has a specified degree of uncertainty with respect to a statistical norm. The computer implemented method according to the present invention includes receiving the projected input parameter data about subsurface features of the cells and the reservoir in the master node, and transferring a petrophysical algorithm to the processor nodes for determining a postulated value of the property of the reservoir cells. The input parameter data for individual cells is distributed from the master node among the plurality of the processor nodes. A postulated value of the reservoir property for individual ones of the reservoir cells is determined in individual ones of the processor nodes. The determined postulated values of the reservoir property for the cells are transferred from the processor nodes to the master node for storage in the data memory on completion of the step of determining by the individual ones of the processor nodes. The steps of distributing, determining and transferring are repeated for the cells of interest in the reservoir model, and the postulated values of the reservoir property for the cells of interest in the reservoir are assembled.

The present invention also provides a new and improved data processing system for computerized simulation of a reservoir model of a property of the subsurface reservoir structure. The reservoir model being simulated is partitioned into a number of cells arranged in an organized system of cells, and the simulation further being is on projected values of input parameters for the cells of the reservoir. The projected value of the input parameter is generated on a random basis and has a specified degree of uncertainty. The data processing system includes a master node which receives the projected input parameter data about subsurface features of the cells and the reservoir and transfers a petrophysical algorithm to the processor nodes for determining a postulated value of the property of the reservoir cells. The master node also distributes the projected input parameter data for individual cells from the master node among the processor nodes. The processor nodes determine a postulated value of the reservoir property for individual ones of the reservoir cells in individual ones of the processor nodes and transfer the determined postulated values of the reservoir property for the cells to the master node for storage in the data memory as the individual ones of the processor nodes complete their determinations for the individual cells. The master node and the processor nodes repeat the distributing, determining and transferring for the cells of interest in the reservoir model, and the master node assembles in the memory the postulated values of the reservoir property for the cells of interest in the reservoir.

The present invention further provides a new and improved data storage device having stored in a computer readable medium computer operable instructions for causing a data processing system comprising at least one master node and a plurality of processor nodes to simulate a reservoir model of a property of the subsurface reservoir structure. The reservoir model being simulated is partitioned into a number of cells arranged in an organized system of cells, and the simulation is based on projected values of input parameters for the cells of the reservoir. The projected values of the input parameter are generated on a random basis and have a specified degree of uncertainty. The instructions stored in the data storage device cause the data processing system to receive the projected input parameter data about subsurface features of the cells and the reservoir in the master node and transfer a petrophysical algorithm to the processor nodes for determining a postulated value of the property of the reservoir cells. The instructions further cause the master node to distribute the input parameter data for individual cells from the master node among the plurality of the processor nodes. The instructions further cause a postulated value of the reservoir property for individual ones of the reservoir cells to be determined in individual ones of the processor nodes. The instructions further cause the transfer of the determined postulated values of the reservoir property for the cells from the processor nodes to the master node for storage in the data memory on completion of the step of determining by the individual ones of the processor nodes. The instructions further for the data processing system to repeat the steps of distributing, determining and transferring for the cells of interest in the reservoir model, and to assemble in the memory the postulated values of the reservoir property for the cells of interest in the reservoir.

BRIEF DESCRIPTION OF THE DRAWINGS

The patent application file contains at least one drawing executed in color. Copies of this patent application publication with color drawings will be provided by the Office upon request and payment of necessary fee.

DETAILED DESCRIPTION OF THE PREFERRED EMBODIMENTS

In reservoir modeling, it is common practice to form models of a subsurface hydrocarbon reservoir in order to analyze the nature and characteristics of the reservoir contents, both geological models of the nature and character of the rock formations or layers of the reservoir and the fluids contained in the rock. The geological models and the reservoir simulation models are very important for simulation for planning of production from the reservoir and full exploitation of the production. An example of models of subsurface reservoirs of the size and complexity often encountered are shown in U.S. Pat. No. 7,526,418, previously mentioned. The present invention provides geological models for reservoirs of this size and complexity. Formation attributes or properties such as water saturation $S_w$, porosity $\phi$, and permeability $\mu$ of formation rock in each of the cells in such a geological model convey valuable information to a reservoir analyst about the nature and character of the rock formations or layers of the reservoir and the fluids contained in the rock.

As has been set forth, models of hundreds of millions to billions of cells are now needed to assimilate all the available detail, in order to provide more accurate models of the reservoir and to lead to more accurate analysis and as a result more effective and efficient reservoir performance.

An example reservoir of the type for which production data are simulated over the expected reservoir life is usually one which is known to those in the art as a giant reservoir. A giant reservoir may be several miles in length, breadth and depth in its extent beneath the earth and might, for example, have a volume or size on the order of three hundred billion cubic feet.

The model is partitioned into a number of cells of suitable dimensions. In partitioning the volume of the reservoir into units at what is known as seismic-scale for analytical purposes, typical cells are each eighty or so feet along their lateral or areal dimensions in a common plane of reference in the reservoir. In some models, the thickness of a cell can be fifteen or less feet in depth or thickness at that location in the reservoir, and even less, down to half a foot.

The reservoir model is thus formed of a million or more cells having these dimensions. As noted, in the case of seismic scale data the number of cells may be hundreds or more times larger than this.

However in simulation of a reservoir of this size, actual data or measurements from the reservoir which could be used to obtain actual measures of reservoir attributes or properties of the types of interest have been available only from core samples taken from existing wells in the reservoir. There were thus vast portions of the reservoir where no well intersects. In the past, averaging methods from the few available data points have been applied. This technique suffered a lack of accuracy in attribute values when representing the usually complex structural nature of a reservoir. This is particularly the case where a giant reservoir is involved.

With the present invention, reservoir properties or attributes such as water saturation, porosity and permeability are determined directly at each cell of a three dimensional grid of a subsurface hydrocarbon reservoir. Input parameters based on original data from petrophysical measurements and other attributes of the reservoir and its subsurface features are generated over a range of uncertainties for the individual cells. The predicted input parameters for the individual cells are provided as processing inputs for petrophysical algorithms. As will be set forth, the petrophysical algorithms for determining reservoir properties of interest are implemented by a data processing system D (FIGS. 2 & 3) which is configured as a cluster computer. Data processing nodes of the cluster computer then determine the properties of a postulated value of the property for the individual reservoir cells.

The input parameters are presented at different measures of possible uncertainties for the cells of the reservoir and are distributed among the processor cluster computer nodes to determine on a cell-by-cell basis a number of possible scenarios or results for the reservoir attributes of interest. The determinations made for the different scenarios are then transferred to a master node of the cluster computer data processing system and assembled as postulated models for sections of interest of the reservoir grid. The postulated models are then evaluated to more accurately obtain reservoir attributes over the reservoir, even for areas where no well intersects the reservoir.

A flowchart F (FIG. 1) indicates the basic computer processing sequence of the present invention and the cluster computation taking place for a reservoir property or attribute according to the present invention. The processing sequence of the flow chart F is performed separately for each reservoir property or attribute of the formations of interest in the reservoir being modeled.

Figure 1:
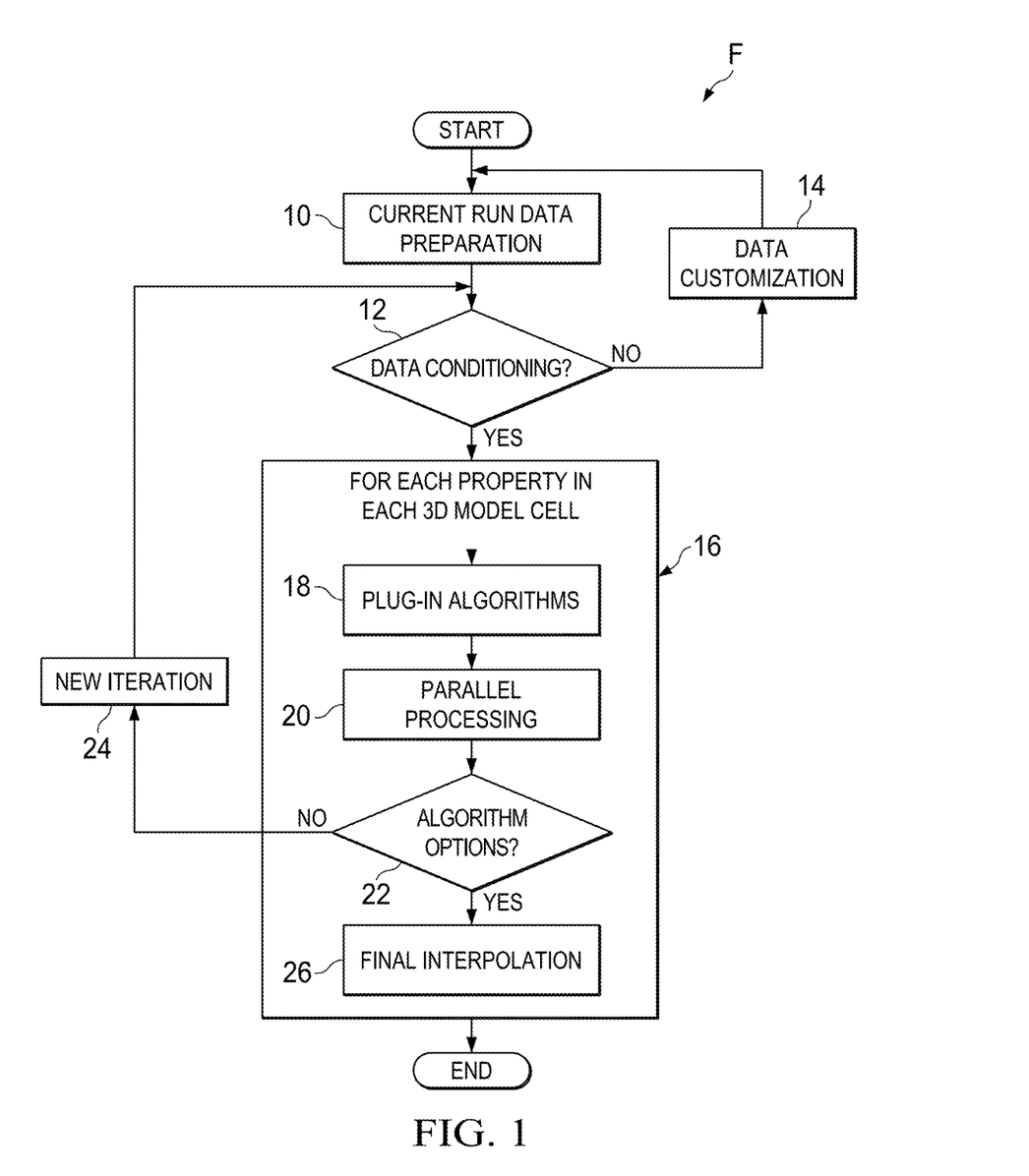
FIG. 1 is functional block diagram of a set of data processing steps performed in a cluster computer for determination of reservoir attributes of subsurface earth formations according to the present invention.

Current Run Data Preparation, (Step 10): Cluster petrophysical uncertainty modeling according to the present invention begins by reading the general parameters as input data. The general parameters read in during step 10 include the following: rock type, porosity for rock type, well pore entrance size, individual cell dimensions and locations in the x, y and z directions; petrophysical measurements and known values of attributes from core sample data; and data available from well logs in areas of the reservoir where actual data have been obtained Data Conditioning (Step 12): During step 12, the input data are evaluated and then formatted for cluster computing during subsequent steps. If errors or irregularities are detected in the input data during data conditioning step 12, processing proceeds to data customization step 14. In a great number of situations where no errors or irregularities are detected, processing proceeds from data conditioning step 12 to property determination data processing step 16.

Data Customization (Step 14): Before simulation takes place, the initial input data are evaluated and analyzed. Any input data determined to be erroneous is removed and processing returns to step 10.

Property Determination (Step 16): During step 16, cluster computing is performed by processor nodes 36 for each of the cells of the reservoir model. As has been set forth, according to the present invention, the properties or attributes of interest are water saturation $S_w$, porosity $\phi$, and permeability $\mu$ of formation rock in each of the cells in the reservoir model. There are a number of conventional and commercially available petrophysical algorithms or computer processing programs for determination of the various reservoir formation properties or attributes of interest.

In the past, so far as is known, such petrophysical algorithms were utilized to derive information at identified depths along the well trajectory based on well log measurements. This information was by definition limited to those areas of penetration and exposure to the reservoir conditions close to the wells. In actual fact, and particularly in giant reservoirs, the reservoir was much larger in volume than the regions where logging data were obtained. With the present invention the petrophysical algorithms are used to determine postulated values for reservoir properties distributed throughout the reservoir in a 3D geological modeling environment covering the entire reservoir space. As has been described, typical reservoirs are usually hundreds of millions of cells.

Plug-In Algorithms (Step 18): During step 18 of the property determination sequence 16, the petrophysical algorithms or computer processing programs for determination of the various reservoir formation properties or attributes are invoked or activated for each of the processor nodes 34.

Parallel node processing (Step 20): During step 20, the master node 30 causes the processor nodes 34 to conduct parallel processing in a cluster computing configuration to determine postulated values for each of the cells of the 3D reservoir model. In performing step 20, the processing is distributed among the cluster of processor nodes 34 by the master node 30, as will be described.

Algorithm. Options (Step 22): During step 22, the calculated value for the cell property is evaluated to determine whether that value is converging after a suitable number of processing calculations. If convergence in the calculated value is not being achieved, processing is transferred to step 24. If convergence is being achieved, processing proceeds to step 26.

New Iteration (Step 24): A new iteration for determining the property of interest in the cells is indicated if during step 22 convergence is not detected in the calculated value. Accordingly, processing is returned to data conditioning step 12 and a new set of proposed values are utilized.

Final Interpolation (Step 26): When the algorithm options step 22 indicates that the calculated value for the cell property is converging, that value is indicated as the final calculated of the property for that cell. The final calculated value of the property is then distributed into the reservoir model stored in memory of the data processing system P.

Figure 2:
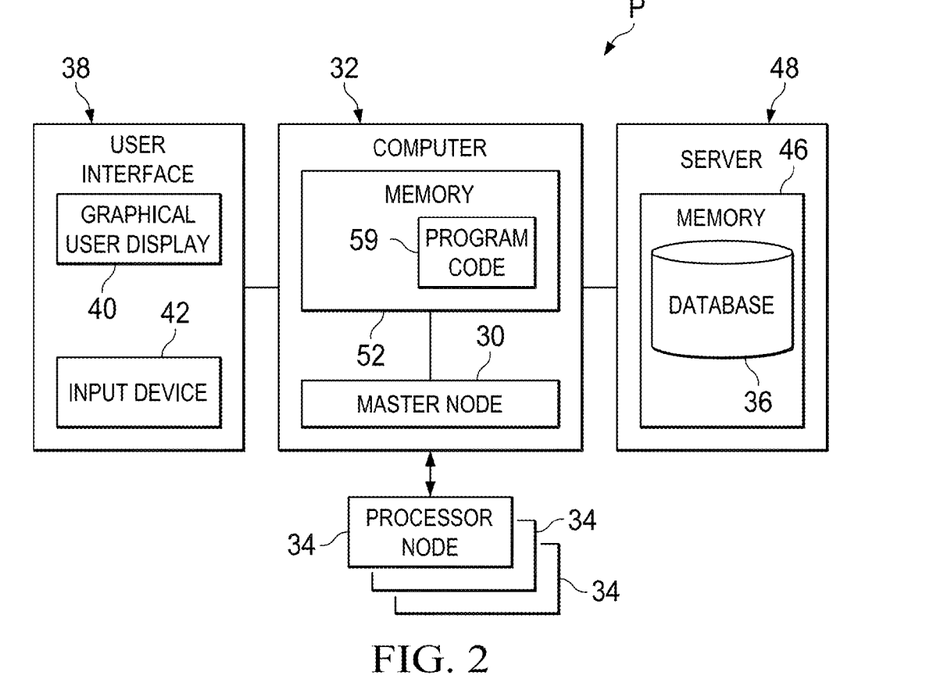
FIG. 2 is a schematic block diagram of a data processing system for determination of reservoir attributes of subsurface earth formations according to the present invention.

With the present invention, as is shown schematically in FIG. 2 in a data processing system P a master node 30 of a CPU 32 and a group of processor nodes 34 for cluster computing of reservoir attributes or properties according to the processing techniques of the flow chart F. Thus, multiple computing processor nodes are used in order to sub-divide the uncertainty modeling of the reservoir into separate cluster computational tasks, so that each processor node 34 is receiving data for individual cells as it is distributed, and performing the petrophysical algorithm separately from the other concurrently operating processor nodes. As the individual processor nodes 34 completes processing for a cell, the processed data results are transferred back to the master node 30, and new data for another cell of interest in the reservoir model is distributed back by the master node. Thus according to the number of processor nodes involved, the computational burden is allocated among them by the master node 30 for cluster computing according to the present invention.

Considering now the data processing system according to the present invention, as illustrated in FIG. 2, the data processing system P is provided for computerized simulation according to the present invention of reservoir properties or attributes such as water saturation, porosity and permeability by cluster computing and determination at each cell of a three dimensional grid of a subsurface hydrocarbon reservoir. The data processing system P includes one or more central processing units or CPU's 32. The CPU or CPU's 32 has associated therewith a reservoir memory or database 36 for general input parameters, core sample data from wells, cell organization data and information, and data processing results. A user interface 38 operably connected with the CPU 32 includes a graphical display 40 for displaying graphical images, a printer or other suitable image forming mechanism and a user input device 42 to provide a user access to manipulate, access and provide output forms of processing results, database records and other information.

The reservoir memory or database 36 is typically in a memory 46 of an external data storage computer 48. The insertion database 36 contains data including the structure, location and organization of the cells in the model, and data general input parameters, core sample data from wells, cell organization data and information, and data processing results for use in reservoir simulation, as will be described below.

The CPU or computer 32 of data processing system P includes the master node 30 and an internal memory 52 coupled to the master node 30 to store operating instructions, control information and to serve as storage or transfer buffers as required. The data processing system P includes program code 54 stored in memory 52. The program code 54, according to the present invention, is in the form of computer operable instructions causing the master node 30 to transfer data and instructions back and forth for processing by processor nodes to simulate reservoir properties or attributes for the individual cells in the reservoir on a cell-by-cell basis, as will be set forth.

It should be noted that program code 54 may be in the form of microcode, programs, routines, or symbolic computer operable languages that provide a specific set of ordered operations that control the functioning of the data processing system P and direct its operation. The instructions of program code 54 may be stored in memory 52 or on computer diskette, magnetic tape, conventional hard disk drive, electronic read-only memory, optical storage device, or other appropriate data storage device having a computer usable medium stored thereon. Program code 54 may also be contained on a data storage device as a computer readable medium.

The processor nodes 34 are general purpose, programmable data processing units programmed to perform the petrophysical algorithms described above and simulate reservoir properties or attributes for the individual cells in the reservoir on a cell-by-cell basis. The processor nodes 34 operate under control of the master node 30 and the processing results represent postulated measures of a reservoir attribute or property for that cell based on a postulated measure of uncertainty. The processed results obtained for the individual cells of interest are then assembled to form reservoir model of the types illustrated by way of example in the drawings.

Although the present invention is independent of the specific computer hardware used, an example embodiment of the present invention is preferably based on a master node 30 and processor nodes 34 of an HP Linux cluster computer. It should be understood, however, that other computer hardware may also be used.

As has been set forth, steps 18, 20, 22 and 26 of the property determination step 20 are performed in a cluster computer configuration of processor nodes. The master node 30 of the data processing system P causes the processor nodes 34 to conduct cluster computing or parallel processing and determine postulated values for each of the cells of the 3D reservoir model on a cell-by-cell basis. Individual ones of the processor nodes 34 are assigned data and cell information on a cell-by-cell basis by master node 30. As individual ones of the processor nodes 34 complete the processing for one assigned cell, the processing results are transferred back to the master node 34. In response, data and cell information for another cell are transferred by the master nodes 30.

The processor nodes 34 thus serve as a cluster computer with each of the processor nodes 34 separately but concurrently with others computing postulated values of properties a property of the subsurface reservoir structure for the assigned cells. The process is repeated by the master node 30 and processor nodes 34 until postulated values for each cell of interest in the reservoir model. The model may be of a selected region or group of formations in the reservoir, or it may be of the reservoir in its entirety.

Figure 3:
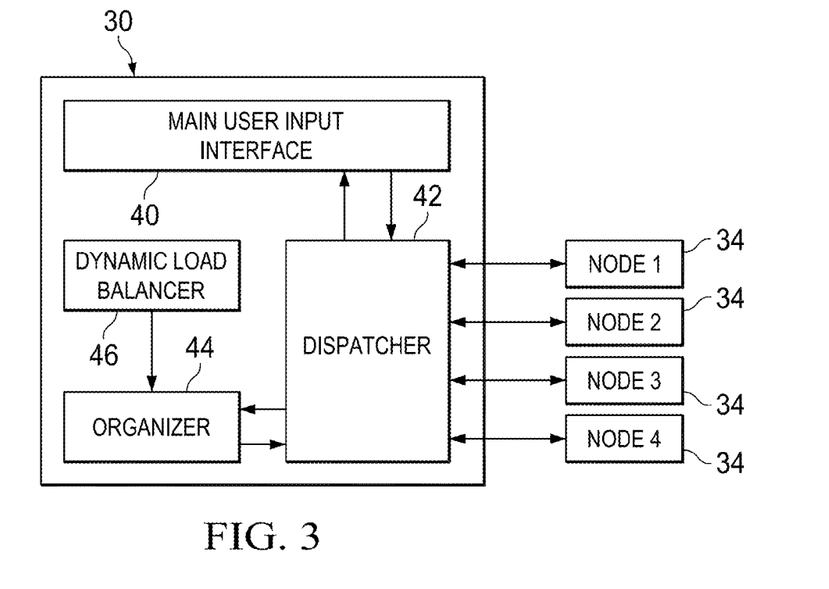
FIG. 3 is a functional block diagram of the data processing system of FIG. 2 configured for determination of reservoir attributes of subsurface earth formations according to the present invention.

FIG. 3 is a schematic diagram of the cluster computing performed by master node 30 and processor nodes 34 according to the present invention. The master node 30 is configured to provide, direct and control flow of data and control instructions and to regulate the transfer of data and instructions to and from the processor nodes 34. The master node 30 also provides certain organizational, data management and computational load oversight and management functionalities.

The master node 30 includes a main user input interface functionality as indicated at 40. The main user input interface 40 identifies by their assigned unique identifier designator the current cells of the 3D reservoir model. The main user input interface 40 also provides the required input parameters needed for property calculation on a cell-by-cell basis for each of the cells to be processed. The main user input interface 40 further identifies the number of iterations needed to be performed in order to smooth the previously calculated property for the current cell. The master node 30 also performs the processing of final interpolation step 26 described above.

A dispatcher functionality as indicated at 42 in the master node 30 distributes or dispatches the current cell property computation process to each of the various processor nodes 34 as required during the cluster computing. As indicated in FIG. 3, the dispatcher 42 controls the interchange and transfer of data, status information and property value calculation results between the processor nodes 34 and the master node 30. The dispatcher 42 of master node 30 also receives feedback status information from each of the processor nodes 34 in order to maintain a record of the status and profile of the various nodes 34. The dispatched 42 also transfers newly calculated property values from the processor nodes 34 to the main user interface for final interpolation and storage in database 36.

An organizer functionality 44 of the master node 30 in conjunction with dispatcher 42 maintains an indication of the current operational status or profile of each of the processor nodes 34. The master node 30 also includes a dynamic load balancer 46 functionality which in conjunction with organizer 44 locates an available processor node 34 which is next available for processing to determine the calculated reservoir property for a cell.

Figure 4:
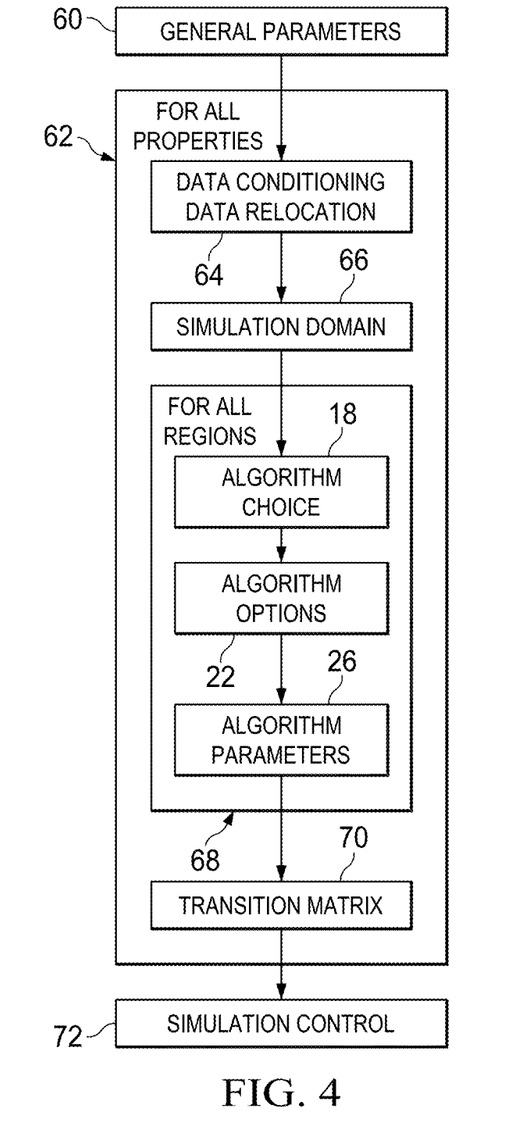
FIG. 4 is functional block diagram of a set of data processing steps performed in a cluster computer for uncertainty modeling and determination of reservoir attributes of subsurface earth formations according to the present invention.

FIG. 4 is a schematic diagram illustrating the overall or composite uncertainty modeling by computerized simulation according to the present invention of a reservoir model of a suite or set attributes or properties of subsurface reservoir structure based on predicted values of input parameters for cells of the reservoir, with the predicted value of the input parameter being generated on a random basis and having a specified degree of uncertainty. As indicated at 60, general parameters are provided. The general parameters include: the object, which identifies the region of interest, whether the entire reservoir or a specified set of strata, or a section or portion of the reservoir; and the property names or types of attributes or properties to be simulated by uncertainty runs to be performed.

As indicated at step 62, for each of the properties identified in step 60, processing according to FIG. 3 described above is performed. During step 64, data conditioning and data relocation as described above and shown in FIG. 1 for each uncertainty run or model of the object to be determined. The simulation domain is specified as indicated at step 66. The results provided during this step include data which indicate reservoir properties in the reservoir area of interest, which may be the entire reservoir, or some region or formation of interest. In addition, the simulation provides a histogram of the conventional type indicating the distribution of data for the simulation. The results of the simulation are also verified to insure that the results honor spatial variability which is appropriate for flow simulation. The processing results from simulation domain step 66 allow an assessment of uncertainty with alternative realizations possible.

During step 68, based on the petrophysical processing algorithm chosen, as well as its options and parameters, the parallel processing or cluster computing procedure illustrated in step 20 of FIG. 1 is performed by processor nodes 34 on a cell-by-cell basis for the specified object. During step 70, a transition matrix of the reservoir attribute data for the cells of the object are assembled in memory of the data processing system P. During step 72, displays of the full suite of postulated values of reservoir attributes or properties for the various specified degrees of uncertainty are formed for simulation control and evaluation.

Figure 5:
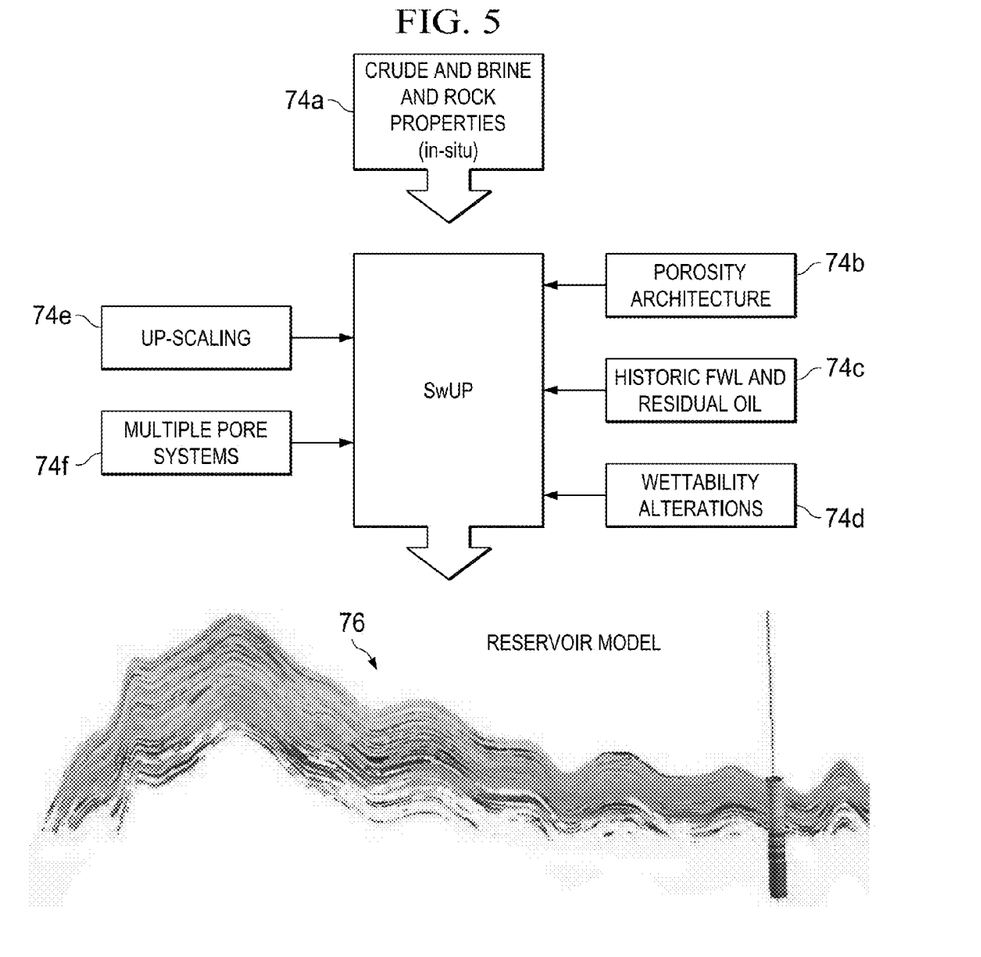
FIG. 5 is a schematic diagram of a process for determination of upscaled water saturation as a reservoir attribute of subsurface earth formations according to the present invention

FIG. 5 illustrates schematically an example procedure for determining postulated values for upscale water saturation $S_wUP$ as a reservoir attribute according to the present invention. Input parameters including: crude, brine, and rock properties in-situ as indicated at 74a; porosity architecture 74b; historical free water level and residual oil data 74c; wettability alterations 74d; as well as parameters indicating the nature of upscaling 74e; and the nature and presence of multiple formation pore systems 74f are provided to the processor nodes 34 by master node 30, along with the petrophysical processing algorithm for determining upscale water saturation. Postulated values of upscale water saturation determined on a cell-by-cell basis by processor nodes 34 are transferred to the master node 30 where they are organized and assembled for the object and stored in memory. As indicated at step 76, a display of upscale water saturation may then be formed.

Figure 6:
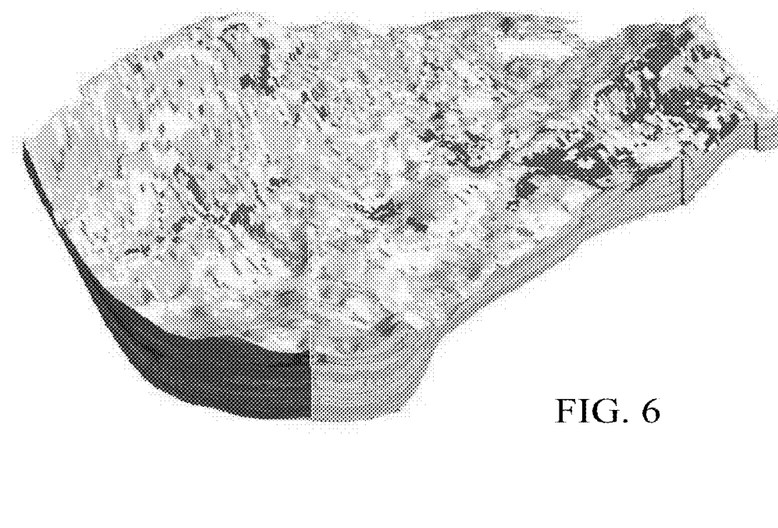
FIG. 6 is a display of a porosity reservoir attribute for a subsurface earth formation obtained according to the present invention.

FIG. 6 is an example display of a model of porosity of certain subsurface rock structure or formations of interest in an actual subsurface reservoir obtained based one possible degree of uncertainty. With the present invention, a number of uncertainty runs are performed for various degrees of uncertainty for the same subsurface structure, and displays of the uncertainty model results of the various runs are obtained. The displays of the several various uncertainty level models of porosity for the formations of interest are then available for reservoir analysts to evaluate and compare. The determinations made for the different scenarios are thus available as postulated models for sections of interest of the reservoir grid. The postulated models are then available to be evaluated to more accurately obtain reservoir attributes over the reservoir, even for areas where no well intersects the reservoir. Based on experience and field data, a porosity model which most accurately to the analyst represents the actual attribute can then be selected and used.

Figure 7:
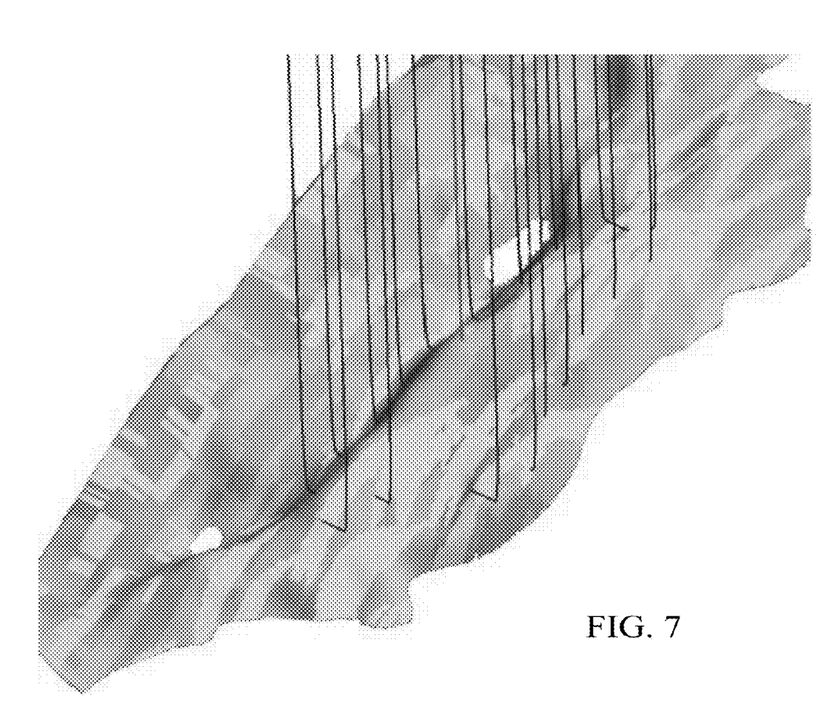
FIG. 7 is an output display of a permeability reservoir attribute for a subsurface earth formation obtained according to the present invention.

FIG. 7 is an example display of a model of another attribute, permeability, of certain subsurface rock structure or formations of interest in an actual subsurface reservoir obtained based one possible degree of uncertainty. Again, with the present invention, a number of uncertainty runs are performed for various degrees of uncertainty for the same subsurface structure and displays similar in format to FIG. 7 of the results of the various runs are obtained. The displays of several various uncertainty level models of the permeability for the formations of interest are then available for reservoir analysts to evaluate and compare. Based on experience and field data, a permeability model which most accurately represents the actual attribute can then be selected and used.

Figure 8:
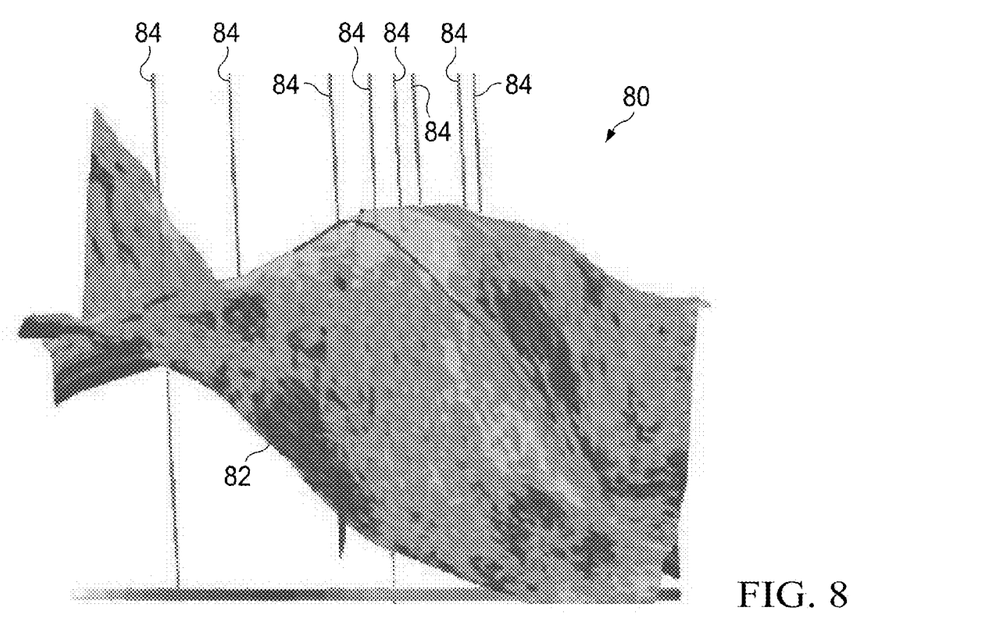
FIG. 8 is an output display of a permeability reservoir attribute for a subsurface earth formation obtained according to prior art processing techniques.

FIG. 8 is a display of a model 80 of cells of certain subsurface rock structure or formations 82 of interest in an actual subsurface reservoir displaying calculated permeability. The permeability values which are displayed in FIG. 8 were obtained based on known prior art interpolation techniques based on permeability values obtained from cell information at the locations of existing wells in the reservoir. The vertical lines 84 extending downwardly into and in some cases through the formations 82 represent existing wells communicating with wellheads at the surface.

Figure 9:
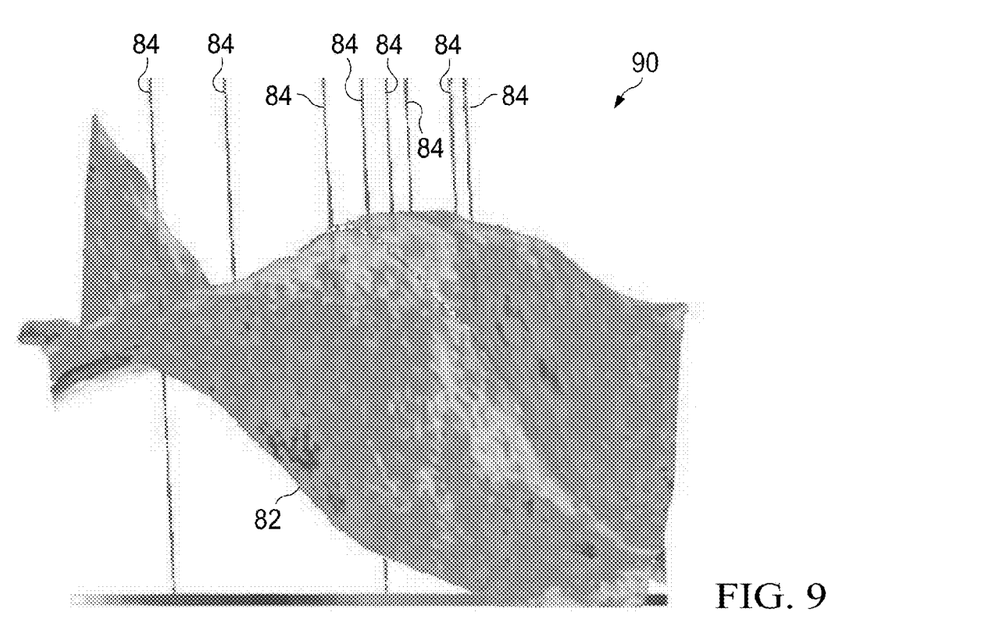
FIG. 9 is an output display of a permeability reservoir attribute for the same subsurface earth formation as displayed in FIG. 8, but obtained according to the present invention.

FIG. 9 by way of comparison is a display of a model 90 of the same certain subsurface rock structure or formations 82 of interest as in FIG. 8 for an actual subsurface reservoir displaying calculated permeability. In FIG. 9, the permeability values displayed for the cells of the model 90 were determined according to the present invention using uncertainty modelling and cluster computing. The permeability measures represent updated permeability Thomeer processing values for each of the cells of the model. Because of the volume of data, cluster computing according to the manner illustrated in FIG. 3 was performed to determine the permeability for a number of uncertainty runs, and FIG. 9 represents a likely accurate model.

The data displayed in the model of FIG. 9 has been determined to be statistically reliable and a likely representation of the permeability in the reservoir structure of interest. In comparing the permeability the models of FIGS. 8 and 9, it is to be noted that the model of FIG. 9 exhibits a higher permeability structure in the reservoir structure of interest. Well testing of actual samples has confirmed that the permeability measures of FIG. 9 are in fact more accurately representative of the actual permeability of the subsurface structure of interest.

From the foregoing, it can be seen that the present invention provides unexpected and advantageous features of direct calculation of reservoir attributes and uncertainties at each and every one of the 3D model cells of subsurface formation structure using a distributed cluster computing platform. The results obtained with the present invention can be utilized for multiple purposes, such as field development, reservoir simulation, well planning, characterization, geological modelling and other petrophysical analytical purposes.

The invention has been sufficiently described so that a person with average knowledge in the matter may reproduce and obtain the results mentioned in the invention herein Nonetheless, any skilled person in the field of technique, subject of the invention herein, may carry out modifications not described in the request herein, to apply these modifications to a determined structure, or in the manufacturing process of the same, requires the claimed matter in the following claims; such structures shall be covered within the scope of the invention.

It should be noted and understood that there can be improvements and modifications made of the present invention described in detail above without departing from the spirit or scope of the invention as set forth in the accompanying claims.

What is claimed is:

1. A computer implemented method of computerized simulation, in a computer system including a master node, a plurality of processor nodes and a data memory, of a reservoir model of a reservoir property of a subsurface reservoir structure, the reservoir model being simulated being partitioned into a number of cells arranged in an organized system of cells, the simulation further being based on a petrophysical algorithm determining the reservoir property from predicted values of input parameters for the cells of the reservoir model, the predicted value of the input parameter being generated on a random basis and having a specified degree of uncertainty, the method comprising the computer processing steps of:
   (a) receiving input parameter data about subsurface features of the cells and the reservoir in the master node;
   (b) transferring the petrophysical algorithm from the master node to the processor nodes for determining a postulated value of the property for the cells of the reservoir model;
   (c) distributing the input parameter data for cells of the reservoir model from the master node among the plurality of the processor nodes;
   (d) determining postulated values of the reservoir property for the cells of the reservoir model in individual ones of the processor nodes according to the transferred petrophysical algorithm and different predicted values of the input parameters;
   (e) transferring determined postulated values of the reservoir property for the cells of the reservoir model from the processor nodes to the master node for storage in the data memory on completion of the step of determining by the individual ones of the processor nodes; and
   (f) assembling in the data memory the determined postulated values of the reservoir property for the cells of the reservoir model.

2. The computer implemented method of claim 1, wherein the reservoir property comprises water saturation of the cells of the reservoir model.

3. The computer implemented method of claim 1, wherein the reservoir property comprises porosity of the cells of the reservoir model.

4. The computer implemented method of claim 1, wherein the reservoir property comprises permeability of the cells of the reservoir model.

5. The computer implemented method of claim 1, wherein individual ones of the processor nodes transmit an indication to the master node upon completion of the step of determining a postulated value of the reservoir property, and wherein the master node in response performs the step of:
   distributing input parameter data for another predicted value of the parameter to the processor nodes in response to transmittal of the indication therefrom.

6. The computer implemented method of claim 1, further including the step of:
   repeating the steps of distributing, determining, and transferring for the cells of the reservoir model until postulated values are determined and transferred for each of the cells of the reservoir model.

7. The computer implemented method of claim 6, wherein the computer includes a graphical display device and further including the step of:
   forming an output display of the determined postulated values of the reservoir property for the cells of the reservoir model.

8. The computer implemented method of claim 1, wherein the computer system includes a plurality of master nodes, and wherein the step of receiving comprises the step of:
   receiving input parameter data about subsurface features of the cells and the reservoir in at least one of the master nodes.

9. The computer implemented method of claim 1, wherein the organized system of cells comprises cells in the reservoir model adjacent wells and having input parameter data about subsurface features available from well logging data and remaining cells spaced from wells and having no input parameter data available from well logging data about subsurface features, and wherein:
   the step of receiving includes receiving input parameter data available from well logging data for the cells adjacent wells; and
   the step of determining comprises determining postulated values of the reservoir property for the reservoir cells throughout the reservoir model in individual ones of the processor nodes according to the transferred petrophysical algorithm and different predicted values of the input parameters.

10. The computer implemented method of claim 1, wherein the reservoir property is selected from the group consisting of water saturation, porosity, and permeability of the cells of the reservoir model.

11. A data processing system for computerized simulation of a reservoir model of a reservoir property of a subsurface reservoir structure, the reservoir model being simulated being partitioned into a number of cells arranged in an organized system of cells, the simulation further being based on a petrophysical algorithm determining the reservoir property from predicted values of input parameters for the cells of the reservoir model, the predicted value of the input parameter being generated on a random basis and having a specified degree of uncertainty, the data processing system comprising:
   (a) a master node for performing the steps of:
      (1) receiving input parameter data about subsurface features of the cells and the reservoir in the master node;
      (2) transferring the petrophysical algorithm from the master node to a plurality of processor nodes for determining a postulated value of the property for the cells of the reservoir model;
      (3) distributing the input parameter data for cells of the reservoir model from the master node among the plurality of the processor nodes;
   (b) a data memory
   (c) the plurality of processor nodes for performing the steps of:
      (1) determining postulated values of the reservoir property for the cells of the reservoir model in individual ones of the processor nodes according to the transferred petrophysical algorithm and different predicted values of the input parameter;
      (2) transferring determined postulated values of the reservoir property for the cells of the reservoir model from the processor nodes to the master node for storage in the data memory on completion of the step of determining by the individual ones of the processor nodes; and (d) the master node further performing the step of:
assembling in the data memory the determined postulated values of the reservoir property for the cells of the reservoir model.

12. The data processing system of claim 11, further including:
a graphical display device forming an output display of the determined postulated values of the reservoir property for the cells of the reservoir model.

13. The data processing system of claim 11, wherein the reservoir property comprises water saturation of the cells of the reservoir model.

14. The data processing system of claim 11, wherein the reservoir property comprises porosity of the cells of the reservoir model.

15. The data processing system of claim 11, wherein the reservoir property comprises permeability of the cells of the reservoir model.

16. The data processing system of claim 11, wherein individual ones of the processor nodes transmit an indication to the master node upon completion of the step of determining a postulated value of the reservoir property, and wherein the master node in response further performs the step of:
distributing input parameter data for another predicted value of the input parameter to the processor nodes in response to transmittal of the indication therefrom.

17. The data processing system of claim 11, wherein the master node and the processor nodes perform the step of repeating the steps of distributing, determining and transferring for the cells of interest in the reservoir model.

18. The data processing system of claim 11, further including a plurality of master nodes, at least one of the master nodes performing the step of receiving input parameter data about subsurface features of the cells and the reservoir.

19. The data processing system of claim 11, wherein the organized system of cells comprises cells in the reservoir model adjacent wells and having input parameter data about subsurface features available from well logging data and remaining cells spaced from wells and having no input parameter data available from well logging data about subsurface features, and wherein:
the master node in performing the step of receiving receives input parameter data available from well logging data for the cells adjacent wells; and
the processor nodes in performing the of determining determine postulated values of the reservoir property for the reservoir cells throughout the reservoir model in individual ones of the processor nodes according to the transferred petrophysical algorithm and different predicted values of the input parameters.

20. The data processing system of claim 11, wherein the reservoir property is selected from the group consisting of water saturation, porosity and permeability of the cells of the reservoir model.

21. A non-transitory data storage device having stored computer operable instructions for causing a data processing system comprising a master node, a plurality of processor nodes and a data memory to simulate a reservoir model of a reservoir property of the subsurface reservoir structure, the reservoir model being simulated being partitioned into a number of cells arranged in an organized system of cells, the simulation further being based on a petrophysical algorithm determining the reservoir property from predicted values of input parameters for the cells of the reservoir model, the predicted value of the input parameter being generated on a random basis and having a specified degree of uncertainty, the instructions stored in the data storage device causing the data processing system to perform the following steps:

(a) receiving input parameter data about subsurface features of the cells and the reservoir in the master node;
(b) transferring the petrophysical algorithm from the master node to the processor nodes for determining a postulated value of the property for the cells of the reservoir model;
(c) distributing the input parameter data for the cells of the reservoir model from the master node among the plurality of the processor nodes;
(d) determining postulated values of the reservoir property for the cells of the reservoir model individual ones of the processor nodes;
(e) transferring determined postulated values of the reservoir property for the cells of the reservoir model from the processor nodes to the master node for storage in the data memory on completion of the step of determining by the individual ones of the processor nodes; and
(f) assembling in the data memory the determined postulated values of the reservoir property for the cells of the reservoir model.

22. The data storage device of claim 21, wherein the computer includes a graphical display device and the instructions further include instructions causing the display to perform the step of:
forming an output display of the determined postulated values of the reservoir property for the cells of the reservoir model.

23. The data storage device of claim 21, wherein the reservoir property comprises water saturation of the cells of the reservoir model.

24. The data storage device of claim 21, wherein the reservoir property comprises porosity of the cells of the reservoir model.

25. The data storage device of claim 21, wherein the reservoir property comprises permeability of the reservoir model.

26. The data storage device of claim 21, wherein individual ones of the processor nodes transmit an indication to the master node upon completion of the step of determining a postulated value of the reservoir property, and wherein the instructions include instructions causing the master node in response to perform the step of:
distributing input parameter data for another of the predicted value of the input parameter to the processor nodes in response to transmittal of the indication therefrom.

27. The data storage device of claim 21, wherein the instructions further include instructions causing the processor to perform the step of:
repeating the steps of distributing, determining, and transferring for the cells of the reservoir model until postulated values are determined and transferred for each of the cells of the reservoir model.

28. The data storage device of claim 21, wherein the data processing system comprises a plurality of master nodes, and the instructions further include instructions causing at least one of the master nodes to perform the step of:
receiving input parameter data about subsurface features of the cells and the reservoir.

29. The data storage device of claim 21, wherein the organized system of cells comprises cells in the reservoir model adjacent wells and having input parameter data about subsurface features available from well logging data and remaining cells spaced from wells and having no input parameter data available from well logging data about subsurface features, and wherein:

the instructions causing the step of receiving include instructions causing receiving of input parameter data available from well logging data for the cells adjacent wells; and the instructions causing the step of determining comprise instructions causing determining postulated values of the reservoir property for the reservoir cells throughout the reservoir model in individual ones of the processor nodes according to the transferred petrophysical algorithm and different predicted values of the input parameters.

30. The data storage device of claim 21, wherein the reservoir property is selected from the group consisting of water saturation, porosity and permeability of the cells of the reservoir model.

* * * * *

UNITED STATES PATENT AND TRADEMARK OFFICE
CERTIFICATE OF CORRECTION

PATENT NO.         : 8,731,891 B2
APPLICATION NO.    : 13/193086
DATED              : May 20, 2014
INVENTOR(S)        : Roger R. Sung and Khalid S. Al-Wahabi Page 1 of 1

It is certified that error appears in the above-identified patent and that said Letters Patent is hereby corrected as shown below:

In the Claims

In Column 14, Line 16, the line appears as "for the cells of the reservoir model individual ones of the" and should read --for the cells of the reservoir model in individual ones of the--.

In Column 14, Line 40, the line appears as "ervoir property comprises permeability of the reservior" and should read --ervoir property comprises permeability of the cells of the reservoir--.

Signed and Sealed this
Twenty-sixth Day of August, 2014

Michelle K. Lee
*Deputy Director of the United States Patent and Trademark Office*